(No Model.)
G. W. EVANS.
MILK CAN.
No. 265,399. Patented Oct. 3, 1882.
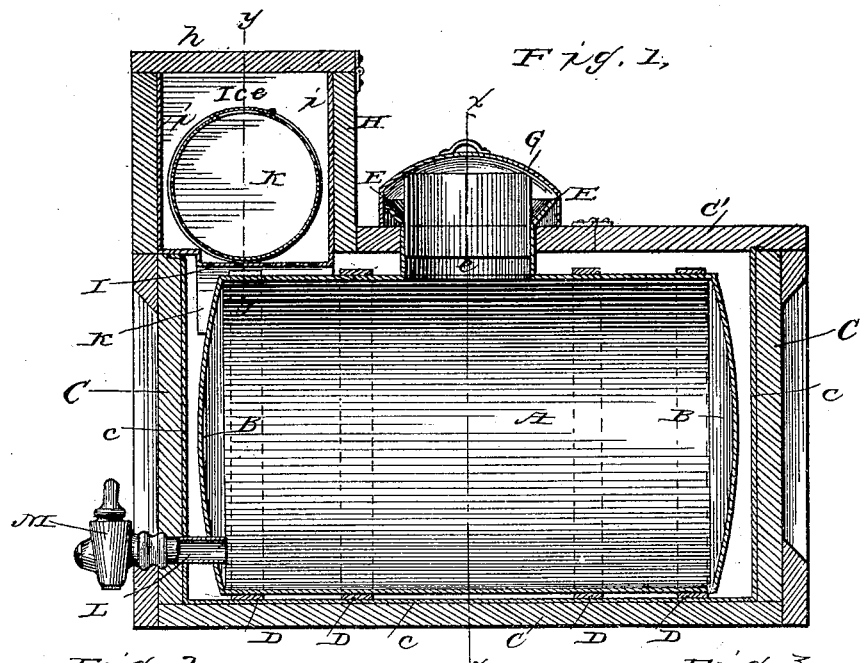
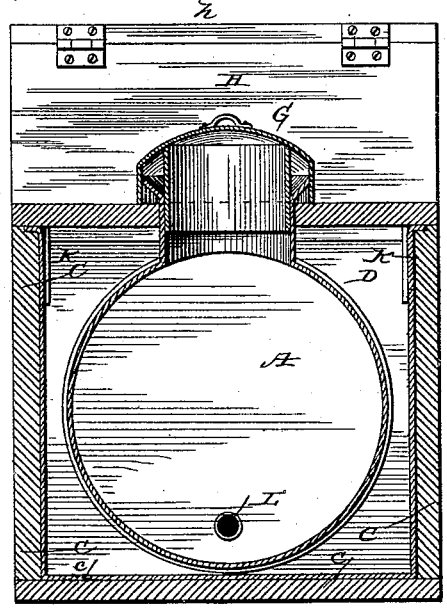
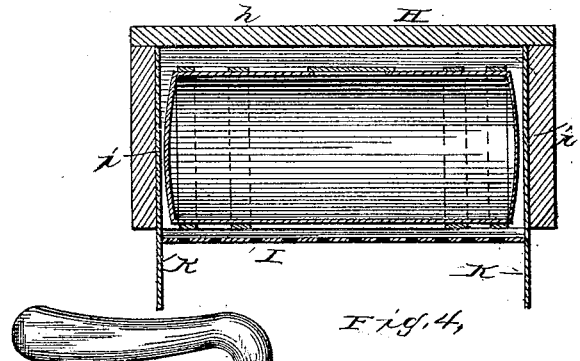
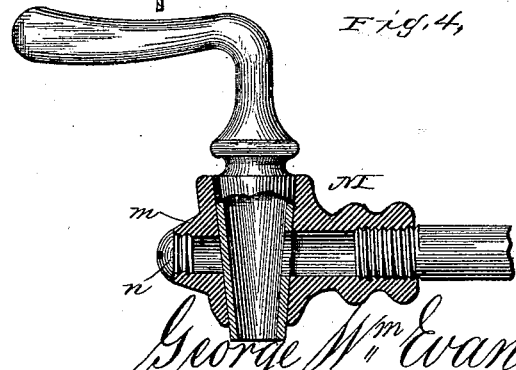
WITNESSES:
Fred. G. Dieterich
Charles H. Pake
George Wm Evans
INVENTOR,
by Louis Bagger & Co,
ATTORNEYS.

UNITED STATES PATENT OFFICE.

GEORGE W. EVANS, OF BALTIMORE, MARYLAND.

MILK-CAN.

SPECIFICATION forming part of Letters Patent No. 265,399, dated October 3, 1882.

Application filed July 18, 1882. (No model.)

*To all whom it may concern:*

Be it known that I, GEORGE WM. EVANS, of Baltimore, in the county of Baltimore and State of Maryland, have invented certain new and useful Improvements in Milk-Cans; and I do hereby declare that the following is a full, clear, and exact description of the invention, which will enable others skilled in the art to which it appertains to make and use the same, reference being had to the accompanying drawings, which form a part of this specification, and in which—

Figure 1 is a longitudinal vertical section of my improved milk and cream can. Fig. 2 is a cross-section of the same through line *x x* in Fig. 1. Fig. 3 is a similar section through line *y y* in Fig. 1, and Fig. 4 is a detail view of my improved faucet or spigot for drawing the milk or cream.

Similar letters of reference indicate corresponding parts in all the figures.

My invention has relation to cans for serving milk or cream to customers; and it consists in the peculiar construction of a can or tank which will hold the milk or cream without churning it, which may be readily cleaned, and in which the milk or cream may be kept sweet for any reasonable length of time, even in very hot weather.

My improved tank or milk-can A is of cylindrical shape, with rounded or bulging ends or heads B B. This tank is placed in a box, C, having a lining, *c*, of zinc or galvanized iron, and is held in its place within the box removably by hoops or bands D.

In the top of the can is an aperture, *e*, which has a flanged collar, E, projecting up through the cover of the box C, which has a removable lid, G, of the usual construction.

C' is the hinged cover of the box, through which access may be had to its interior for cleaning or for other purposes.

At one end of the box is placed a smaller box, H, which has a hinged cover, *h*, a sheet-metal lining, *i*, and a perforated bottom, I. Within this box may be placed a cylindrical tank or vessel, K, similar in construction and arrangement to the large tank A, but of smaller size, and adapted to hold cream in like manner as the large tank is adapted to hold milk. Around this small tank is packed ice, which serves the double purpose of cooling the cream contained in the tank K and furnishing ice-water, which will run through the perforated bottom down into the large box C underneath, and serve to cool the contents of the large tank A. The ice-box is kept in place upon the top of box C by projections *k k* at opposite ends of the perforated bottom, which project down on opposite sides of box C, as shown in Fig. 3 of the drawings.

In one end of the tank A is placed a discharge-pipe, L, the spigot M of which is constructed with a projecting tubular bushing, *m*, adapted to receive a screw or plug, *n*. The bushing *m* is in a line with the inlet-tube, so that the latter may be cleaned out by removing the screw or plug *n* and inserting a piece of stick through the tubular bushing *m* into the inlet-pipe.

In faucets and spigots for milk and cream cans it is of the utmost importance that they should be kept clean, and that the cheese should be removed as soon as formed, so as to prevent the milk from souring or becoming tainted by sediment or impurities in the spigots.

The advantage of my cylindrical milk or cream can resting on its side within box C is this, that it effectually prevents churning of the milk or cream.

In upright cylindrical milk or cream cans of the usual construction the contents of the can, by being dashed violently against its sides when the can is being transported in a wagon over rough pavements, is apt to churn the contents of the can and form butter; but by placing the can on its side and providing it with rounded or bulging heads I have found that large quantities of milk or cream may be transported long distances over the roughest roads or pavements without visibly affecting the contents of the can, which are cooled off by the cold air or ice-water contained in the water-box or casing C, the cover of which should fit tightly.

I am aware of the constructions shown and described in Patents Nos. 57,479, of 1866, 68,696, of 1867, and 184,091, of 1876, and such constructions are not sought to be covered in this application, this invention being designed as an improvement upon such.

Having thus described my invention, I claim and desire to secure by Letters Patent of the United States—

The combination of the box or casing C, containing the removable cylindrical milk-can A, having bulging heads B B and aperture e, provided with a flanged collar, E, and lid G, and the removable box H, having perforated bottom I, provided with parallel projections k k, and cylindrical cream-can K, all constructed and arranged substantially as and for the purpose herein shown and set forth.

In testimony that I claim the foregoing as my own I have hereunto affixed my signature in presence of two witnesses.

GEORGE WM. EVANS.

Witnesses:
LOUIS BAGGER,
JNO. A. MADIGAN.